Sept. 1, 1970            J. L. BROOKMIRE            3,526,790

SYNCHRONOUS SWITCHING CIRCUITS

Filed June 23, 1967            2 Sheets-Sheet 1

INVENTOR
JAMES L. BROOKMIRE

BY
ATTORNEY

Sept. 1, 1970        J. L. BROOKMIRE        3,526,790

SYNCHRONOUS SWITCHING CIRCUITS

Filed June 23, 1967        2 Sheets-Sheet 2

INVENTOR.
JAMES L. BROOKMIRE

BY
ATTORNEY

United States Patent Office 3,526,790
Patented Sept. 1, 1970

3,526,790
SYNCHRONOUS SWITCHING CIRCUITS
James L. Brookmire, Marcellus, N.Y., assignor to General Electric Company, a corporation of New York
Filed June 23, 1967, Ser. No. 648,334
Int. Cl. H03k 3/26
U.S. Cl. 307—284
13 Claims

ABSTRACT OF THE DISCLOSURE

A circuit for synchronously switching a resistive load energized by an alternating current supply at or near zero voltage in a semiproportional manner in response to variations in the resistance of a variable resistance sensing element such as a thermistor. The variable resistance sensing element is included in a resistance voltage divider from which is derived a control voltage which is applied to the gate of a reverse blocking triode thyristor. The reverse blocking triode thyristor controls the application of a signal to the gate of a second triode thyristor, the main terminals of which are connected in series with the load.

BACKGROUND OF THE INVENTION

Control circuits have been provided in which a controllable semiconductive device controls the energization of a load from an alternating current supply. These prior art control circuits represent various methods for varying the RMS voltage applied to the load. In one of the prior art methods commonly known as phase control, the controllable semiconductive device is caused to conduct for only a certain portion of each cycle or half cycle of the alternating current supply voltage. In utilizing phase control to control the energization of resistive loads, radio-frequency interference is generated by switching the controllable semiconductive device at instantaneous voltages which may be as great as the peak supply voltage. Thus, when using phase control to control the energization of a resistive load it is necessary to provide extensive and costly radio-frequency filtering, in order to prevent the transmission of radio-frequency interference from the phase control circuit through the alternating current supply system.

SUMMARY

It is therefore an object of this invention to provide a novel and improved synchronous switching circuit utilizing a controllable semiconductive device having two main current carrying terminals and at least one additional gate terminal, in a circuit arrangement whereby the controllable semiconductive device is caused to assume its low impedance characteristic only at or near a zero voltage of the alternating current supply from which it is energized.

It is another object of this invention to provide a novel and improved synchronous switching circuit for controlling the energization of a resistive load from an alternating current supply wherein radio-frequency interference is largely eliminated without the need for filtering circuits.

It is a further object of this invention to provide a synchronous switching circuit providing semiproportional energization of a resistive load in response to changes in resisance of a variable resistance sensing element wherein the resistive load is precisely energized at or near zero voltage to effectively eliminate radio-frequency interference.

These objects are accomplished in accordance with this invention, in one form thereof, by providing a synchronous switching circuit including therein a thyristor which is caused to assume its low impedance state only at or near a zero-voltage crossing of the alternating current, in response to receiving a gate signal at a gate terminal from a control circuit. The control circuit includes a resistance voltage divider which is energized by a pedestal voltage derived from the alternating current supply. The resistive voltage divider includes a variable resistance sensing element which senses a condition in accordance with which the energization of a load is to be controlled. A differentiating circuit associated with the resistance voltage divider adds a positive pulse to a portion of the pedestal voltage appearing across the resistance divider which is applied to the control terminal of a controllable semiconductive device, to control the impedance state of the semiconductive device. The semiconductive device controls the application of a gate signal to a gate terminal of the thyristor, the main terminals of which are connected in series with the load across the alternating current supply.

Other objects and further details of that which is believed to be novel and the invention will be clear from the following description and claims taken with accompanying drawings wherein:

DESCRIPTION OF THE PREFERRED EMBODIMENTS

Figure 1:
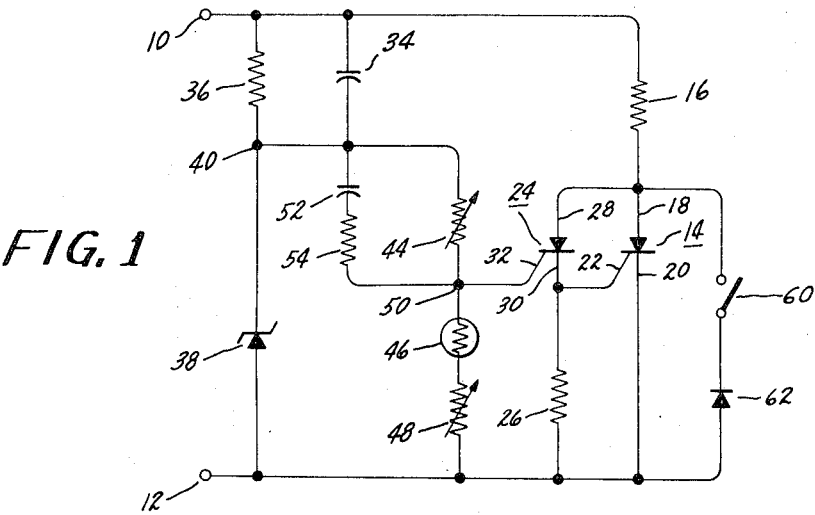
FIG. 1 is a circuit diagram illustrating an embodiment of this invention providing synchronous control of a reverse blocking triode thyristor.

Referring to the circuit diagram of FIG. 1, one embodiment of a synchronous switching circuit in the form of a pulse and pedestal zero-voltage switch or as it may be referred to, a control circuit for energizing a load in a semiproportional manner from an alternating current supply will be described. The control circuit is energized by connecting its two external terminals 10 and 12 to an alternating current supply. The control circuit includes a semiconductive unidirectional device 14 connected in series with a load 16 between the terminal 10 and 12. The semiconductive unidirectional device is shown as having main current carrying terminals 18 and 20, and a gate or trigger terminal 22. The device shown is commonly called a semiconductor controlled rectifier or SCR and by International Electro-Technical Commission standards named a reverse blocking triode thyristor. While this particular device is shown, which will hereinafter be referred to as a SCR, any other semiconductive unidirectional device which has at least one gate terminal, may be employed. It is only necessary that the semiconductive unidirectional device which is employed exhibit a high impedance characteristic in the absence of a signal of a predetermined amplitude at its gate, and that it exhibits a low impedance characteristic in the presence of a signal of a magnitude greater than the predetermined amplitude at its gate.

The gate terminal 22 of load SCR 14 is energized by a gate circuit which is in turn energized by a control circuit. The gate circuit includes a second or control SCR 24 having main current carrying terminals 28 and 30, and a gate or trigger terminal 32. The main terminals 28 and 30 of SCR 24 and a current limiting resistor 26 are connected in series across the main current carrying terminal 18 and 20 of SCR 14, with the gate 22 of SCR 14 connected to the junction between SCR 24 and current limiting resistor 26. The impedance of current limiting resistor 26 is chosen such that when SCR 24 assumes its low impedance state, the current flowing between its main current carrying terminals is held within its current rating.

The control circuit which provides a turn-on signal to gate 32 of SCR 24 includes a parallel RC phase shift circuit comprising parallel connected capacitor 34 and resistor 36, and a voltage regulating element 38 connected in series between the terminals 10 and 12. The voltage regulating element 38 is shown as a Zener diode, which is one of the many known types of voltage regulating elements which might be utilized. The Zener diode 38 has Zener voltage considerably less than the peak magnitude of the alternating current voltage applied to terminals 10 and 12, such that the voltage appearing at junction 40 between the RC phase shift circuit and Zener diode 38 when terminal 10 is positive, is a pedestal as shown by dashed lines 42 in FIG. 2. Connected across the Zener diode 38 is a resistive voltage dividing network comprising a variable resistor 44, a variable resistance sensing element 46, and a second variable resistance 48. The variable resistance sensing element 46, may be any device or circuit which increases in resistance in response to a change in a sensed condition which dictates energization of the load 16. Junction 50 between variable resistor 44 and sensing element 46 is connected to gate terminal 32 of SCR 24, such that when the voltage at junction 50 exceeds a predetermined amplitude SCR 24 assumes its low impedance characteristic, i.e., is turned on.

In order to precisely control the phase angle of the alternating current supply at which SCR 24 is turned on, a differentiating circuit including serially connected capacitor 52 and resistor 54 is connected in parallel with the variable resistor 44. This differentiating circuit causes a positive pulse to be superimposed on that portion of the pedestal voltage shown in FIG. 2 which appears at terminal 50. The combined pulse-and-pedestal voltage appearing at terminal 50 is shown by the solid line 56 in FIG. 2.

Before setting forth the operation of the control circuit just described, a typical use of the circuit as a temperature control circuit will be set forth. In a typical application, the resistance sensing element 46 may be a negative temperature coefficient thermistor which senses the temperature in a region heated by the energization of a resistance heater 16. In order to provide fast sensing, a bead thermistor may be used. However, with slower thermal reaction good sensitivity is provided at very low cost. Other applications of the circuit include control of the energization of hot-wire relays, or low-inductance relays where the thermistor may be at any sensing temperature desired within the temperature range of the thermistor. The circuit may also be used in applications where the resistance sensing element 46 is a photoresistor, a pile-type pressure sensor, a resistance-type humidity sensor, or any other resistance sensor.

Figure 2:
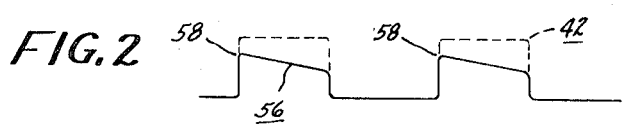
FIG. 2 is a diagram showing the voltage wave forms at two junctions in the circuit shown in FIG. 1.

Considering now the operation of the control circuit as a temperature control circuit, with terminal 10 and 12 energized, such as by a 120 volt 60 Hertz supply, the parallel RC phase shift circuit comprising capacitor 34 and resistor 36 provides a leading phase shifted voltage to the Zener diode 38. In a typical application the Zener diode 38 has a Zener voltage of 6.2 volts so as to establish a pedestal voltage of 6.2 volts at junction 40. A variable portion of this pedestal voltage appears at junction 50. The differentiating circuit including capacitor 52 and resistor 54 causes a pulse to be superimposed on this variable portion of the pedestal voltage as shown in FIG. 2 by solid line 56. With the resistance of negative temperature coefficient thermistor 46 at its normal magnitude for a preset temperature, the variable resistor 44 is adjusted such that the peak voltage of the positive decaying pulse as shown in FIG. 2 will not exceed the predetermined voltage amplitude which when applied to the trigger 32 and SCR 24 causes it to be turned on to conduct.

A decrease in the temperature sensed by the thermistor 46 will cause its resistance to increase such that the portion of the pedestal voltage appearing at junction 50 which is applied to gate 32 increases. The increase in pedestal voltage at junction 50 causes the peak amplitude of the positive decaying pulse that rides the pedestal to be greater than the predetermined amplitude necessary to turn on SCR 24. The peak amplitude occurs at point 58 as shown in FIG. 2. The turning on of SCR 24 causes a voltage to appear at gate 22 of the load current carrying SCR 14, thereby turning it on. Load current will then flow through load 16 and SCR 14.

In order to suppress radio-frequency interference, the phase shift provided by the parallel RC phase shift circuit comprising resistor 36 and capacitor 34 is such as to cause the peak amplitude 58 of the combined pulse and pedestal shown by solid line 56 in FIG. 2 to occur when the supply voltage is zero just prior to a positive half cycle. Thus, the turning on of the SCR's 14 and 24 occurs at zero voltage and the generation of radio-frequency interference is greatly reduced. Radio-frequency interference may be further reduced by adjustment of the resistance of variable resistor 48.

In a specific application, where the circuit is energized by a 120 volt, 60 Hertz alternating current supply the values of the particular components are as follows:

Resistor 36—6.2 kilohms±5%, 2 watts
Voltage regulator 38—Zener diode with 6.2 Zener voltage
Capacitor 34—.15 microfarad ±5%, 200 v. DC
Capacitor 52—.47 microfarad
Resistor 54—220 ohms
Variable resistor 44—5 kilohms
Sensing resistor 46—thermistor 100 ohms at sensing temperature such as GE type 3DO54
Variable resistor 48—100 ohms
Silicon controlled rectifier 24—GE C106B or GE C6B
Resistor 26—33 ohms
Silicon controlled rectifier 24—GE C20B, C30B, or C35B In this special application, the circuit is highly stable for variations in input line voltage plus effects of ambient temperature due to the lock-in configuration of SCR's 14 and 24, and the planar construction SCR 24. The sensing differential at normal room ambient is approximately plus or minus ¼ degree fahrenheit about the set point. Using a bead thermistor, the thermal response of the circuit is extremely fast. The thermal time constant is in the order of one to two seconds.

The circuit as just described provides half wave energization of load 16 in a semiproportional manner. Semiproportional manner as used herein defines a control in which the load is energized for complete positive half cycles so long as the sensed condition dictates energization of the load, and in which the load is not energized so long as the sensed condition dictates the load should not be energized. If it is desirable to maintain the load energized during negative half cycles and to semiproportionally control energization of the load during positive half cycles, a switch 60 may be closed to connect a diode 62 in series with the load 16 between the terminals 10 and 12. In this manner energization of the load is semiproportionally controlled between 50 and 100 percent.

Figure 3:
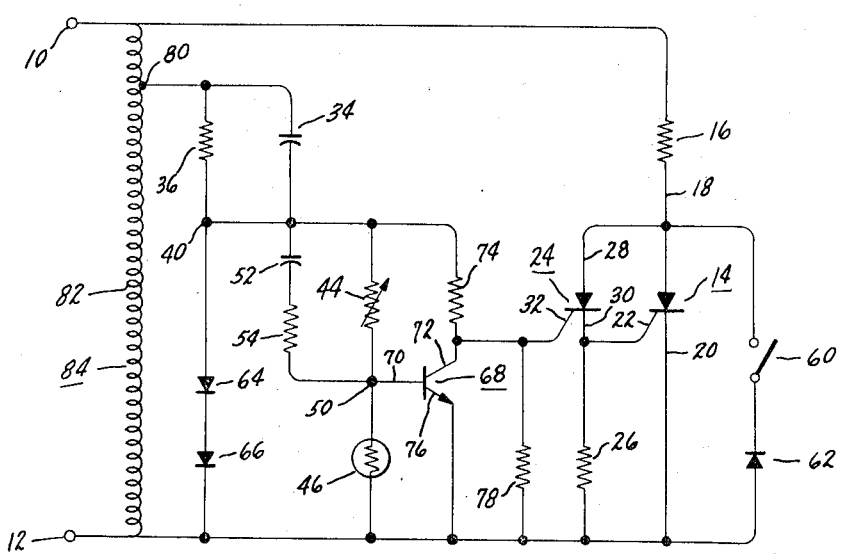
FIG. 3 is a circuit diagram illustrating an embodiment of this invention providing synchronous control of a reverse blocking triode thyristor and which is particularly designed for use with a variable resistance sensing element having a low resistance range.

FIG. 3 shows an adaptation of the synchronous switching circuit of this invention in the form of a pulse and pedestal zero-voltage switch which is particularly designed for use with variable resistance sensing elements having a very low resistance range such as from 1 through 100 ohms. Circuit elements which correspond to circuit elements shown in FIG. 1 are identified by the same numerals. In this circuit a pair of serially connected diodes 64 and 66 replace the Zener diode 38 shown in the previously discussed embodiment. The serially connected diodes have a combined forward voltage drop which is considerably less than that of the Zener diode in the previously described circuit. The control circuit is energized at a reduced voltage appearing at a tap 80 on winding 82 of an autotransformer 84. Where a 120 volt alternating current source is connected to terminals 10 and 12, the tap 80 may provide 12.5 volts for energizing the control circuit. Since the voltage appearing at junction 40 is of a lesser magnitude in this circuit than in the circuit shown in FIG. 1, in order to provide a sufficient signal at gate 32 to fire SCR 24, a transistor amplifier including transistor 68 is provided. Base 70 of transistor 68 is connected to the junction 50 of sensing element 46 and variable resistor 44, and collector 62 is connected to be energized at the pedestal voltage appearing at junction 40 through a resistor 74. Emitter 76 of transistor 68 is connected to terminal 12. Gate 32 of control SCR 24 is connected directly to collector 72 of transistor 68 and to terminal 12 through a resistor 78. The load 16 and power SCR 14 are connected in series across terminals 10 and 12 in parallel with winding 82 of autotransformer 84 to be energized by the alternating current supply.

The operation of the circuit shown in FIG. 3 is generally the same as that previously set forth for the circuit shown in FIG. 1. However, when the circuit shown in FIG. 3 is used as a temperature control circuit a positive temperature coefficient thermistor is used, rather than a negative temperature coefficient thermistor as was used in the circuit of FIG. 1. Utilizing a very low resistance positive temperature coefficient sensor such as nickel wire or tungsten as sensing element 46, the circuit shown may be used with a hot-wire relay or a low-inductance low-power relay as the load 16.

An increase in the temperature of positive temperature coefficient sensor 46 above the temperature preset by variable resistor 44, will cause the resistance of sensor 46 to increase, thereby increasing the proportion of the pedestal voltage applied to the base 70 of transistor 68. Thus, transistor 68 will be caused to conduct from collector 72 to emitter 76, so as to prevent the application of a signal to gate 32 of control SCR 24 through resistor 74. As previously set forth with respect to the circuit shown in FIG. 1, power SCR 14 is only turned on to energize load 16 when control SCR 24 is turned on, and since transistor 68 prevents the turning on of SCR 24 the load 16 is not energized.

When the temperature of sensor 46 drops below the preset temperature, a lesser proportion of the pedestal voltage is applied to base 70 of transistor 68. This reduced base voltage is insufficient to cause transistor 68 to conduct. Therefore, a signal will be applied to the gate 32 of control SCR 24 through resistor 74 to cause control SCR 24 to conduct. As previously described with respect to FIG. 1, the turning on of contact SCR 24 also causes load SCR 14 to conduct, thereby energizing load 16.

Figure 4:
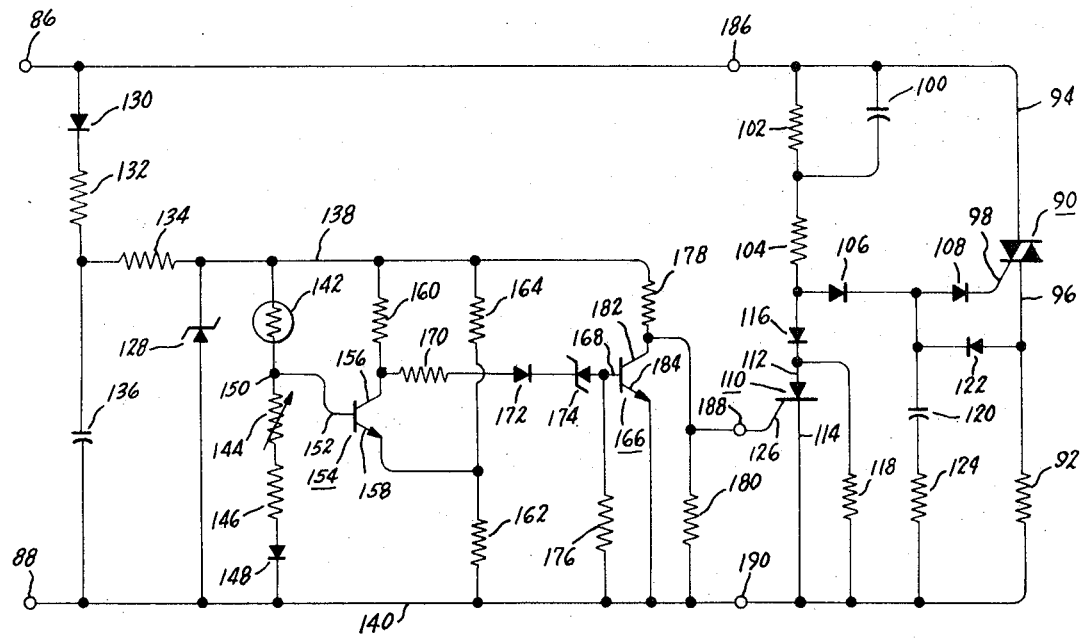
FIG. 4 is a circuit diagram illustrating an embodiment of this invention providing high precision synchronous control of a bidirectional triode thyristor.

Referring now to FIG. 4, an alternate embodiment of the invention is shown in which high-precision, zero-voltage switching is provided in an arrangement wherein synchronous control of semiconductive bidirectional device 90 is provided to control the energization of a load 92 from an alternating current supply connected to external terminals 86 and 88. The semiconductive bidirectional device is shown as having main current carrying terminals 94 and 96, and a gate or trigger terminal 98. The device shown is commonly called Triac and by International Electro-Technical Commission Standards named a bidirectional triode thyristor. While this particular device is shown, which will hereinafter be referred to as a Triac, any other semiconductive bidirectional device which has at least one gate terminal, may be employed. It is only necessary that the semiconductive bidirectional device which is employed exhibit a high impedance characteristic in the absence of a signal of a predetermined amplitude at its gate, and that it exhibit a low impedance characteristic in the presence of a signal of a magnitude greater than the predetermined amplitude at its gate.

The gate terminal 98 of Triac 90 is energized by a gate circuit which is in turn energized by a control circuit. The gate circuit includes a parallel RC phase shift circuit comprising parallel connected capacitor 100 and resistor 102 which supplies a phase shifted voltage to gate 98 through a circuit including resistor 104 and diode 106 and 108. However, a signal is provided to gate 98 from the RC phase shift circuit for zero-voltage switching of Triac 90 only when an SCR 110 having main terminals 112 and 114 which is connected between the junction of resistor 104 and diode 106 in series with diode 116, is in its high impedance state. Resistor 118 along with resistor 104 forms a resistance voltage divider which establishes the portion of the phase shifted voltage supplied to the gate 98 of Triac 90.

When the supply voltage applied to terminals 86 and 88 appears across the load 92, with terminal 86 positive with respect to terminal 88, a capacitor 120 which is connected in series with a diode 122 and a resistor 124, in parallel with the load 92 is charged. During the following negative half cycle, that is when terminal 88 is positive with respect to terminal 86, capacitor 120 discharges through resistor 124 and diode 108 to provide a signal at the gate 98 of Triac 90 to cause it to conduct during the following negative half cycle.

The control circuit which provides a signal to gate 126 of SCR 110 is energized by a filtered and regulated D.C. supply voltage which is derivde from the alternating current supply connected to terminals 86 and 88. A voltage regulating element such as Zener diode 128 is connected in series with a diode 130 and resistors 132 and 134 across the terminals 86 and 88 to be energized by the alternating current supply. Capacitor 136 connected between the junction of resistors 132 and 134 and terminal 88 along with the ressitor 134 provides filtering of the D.C. voltage developed across Zener diode 128.

The regulated and filtered voltage appearing across Zener diode 128 between positive bus 138 and negative bus 140 is applied to a resistance voltage divider circuit comprising variable resistance sensing element 142, a variable resistor 144, a fixed resistor 146, and a diode 148. The voltage appearing at junction 150 between sensing element 142 and variable resistor 144 is applied to base 152 of a transistor 154 to control conduction between its collector 156 and its emitter 158. Collector 156 is connected through a resistor 160 to positive bus 138, while the emitter 158 is connected through a resistor 162 to the negative bus 140.

A second stage of amplification is provided by a transistor 166. Base 168 of transistor 166 is connected to the collector 156 of transistor 154 through a series circuit comprising a resistor 170, a diode 172, and a Zener diode 174. Base 168 is also connected to negative bus 140 through a resistor 176. Collector 182 of transistor 166 is connected to the positive bus 138 through a resistor 178 and directly to the gate 126 of SCR 110. Resistor 180 connected between gate 126 of SCR 110 and the negative bus 140 forms with resistor 178 a resistance voltage divider which establishes the voltage at the gate 126 of SCR 110.

The operation of the circuit shown in FIG. 4, with the sensing element being a high resistance negative temperature coefficient thermistor will now be set forth. With the temperature of thermistor 142 below the temperature preset by variable resistor 144, the increased resistance of thermistor 142 will cause a decrease in the voltage appearing at junction 150 thereby reducing the base current of transistor 154. This reduced base current is amplified as a greater reduction of the collector-emitter current flow through transistor 154. The decrease in the collector-emitter current flow in transistor 154 causes the voltage at the junction of resistors 160 and 170 to raise, thereby increasing the base current of transistor 166. The increased base current of transistor 166 is amplified as a greater increase in collector-emitter current flow through transistor 166, thereby reducing the voltage appearing at gate 126 of SCR 110 below the level necessary to cause SCR 110 to be triggered to its low impedance state.

With SCR 110 not conducting, or in its high impedance state, a signal is applied to the gate 98 of Triac 90 from the RC phase shift circuit comprising capacitor 100 and resistor 102 to turn-on Triac 90 at the next zero voltage of the alternating current supply preceeding a positive half cycle. As set forth above, capacitor 120 provides a signal to the gate 98 of Triac 90 at the beginning of a negative half cycle following a positive half cycle during which Triac 90 was conducting to maintain the Triac 90 in its low impedance state. While capacitor 120 is charged during the negative half cycle, the charge will not trigger the Triac during the succeeding positive half cycle since the voltage drop across diode 122 limits the voltage applied to the gate 98 to a value less than that necessary to trigger the Triac.

Should the temperature rise above the predetermined temperature set by variable resistor 144, the decreased resistance of a negative temperature coefficient thermistor 142 will increase the voltage appearing at junction 150, thereby increasing the base current of transistor 154. This reduced base current is amplified as a greater increase of the collector-emitter current flow through transistor 154. The increase in the collector-emitter current flow in transistor 154 causes the voltage at the junction of resistor 160 and 170 to drop, thereby decreasing the base current of transistor 166. The decreased base current of transistor 166 is amplified as a greater decrease in the collector-emitter current flow through transistor 166, whereupon the voltage appearing at gate 126 of SCR 110 raises to a level sufficient to trigger SCR 110 to its low impedance state.

With SCR 110 conducting, the voltage at the junction of resistor 104 and diode 106 is reduced below the level necessary to trigger Triac 90, whereupon Triac 90 remains in its high impedance state and the load 16 is not energized.

Should the voltage applied to gate 126 of SCR 110 be reduced below the level necessary to trigger SCR 110 during a positive half cycle, SCR 110 will continue to conduct for the remainder of that positive half cycle, such that Triac 90 will be synchronously fired at the voltage zero preceeding the next positive half cycle, A decrease in the voltage applied to gate 126 of SCR 110 during a negative half cycle to a level below that necessary to trigger SCR 110 will result in Triac 90 being synchronously fired at the next voltage zero preceeding the next positive half cycle. If the voltage applied to the gate 126 of SCR 110 is increased to a level sufficient to trigger SCR 110 during a positive half cycle, SCR 110 will immediately begin to conduct, but Triac 90 will also continue to conduct during the remainder of the positive half cycle and during the succeeding negative half cycle. An increase in the voltage applied to the gate 126 of SCR 110 during a negative half cycle to a level sufficient to trigger SCR 110 during a positive half cycle, will not of course cause SCR 110 to conduct during the negative half cycle. Thus, synchronous firing of Triac 90 at a supply voltage zero preceeding a positive half cycle is provided, irrespective of when the voltage applied to the gate 126 of SCR 110 changes from a magnitude sufficient to fire SCR 110 to one insufficient to fire SCR 110, or vice versa.

Figure 5:
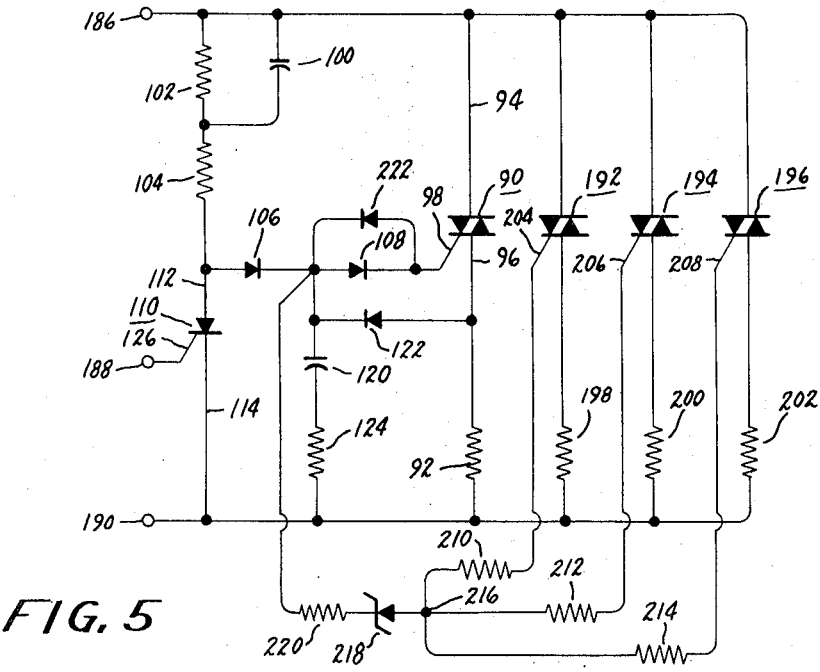
FIG. 5 is a circuit diagram illustrating a modification of the embodiment of this invention shown in FIG. 4 to provide synchronous control of larger amounts of power.

For increased load carrying capabilities the circuit of FIG. 4 may be modified as shown in FIG. 5 to provide slave driving of a purality of Triacs. The portion of the circuit shown to the right of terminals 186, 188, 190 in FIG. 4 is replaced by the circuit shown in FIG. 5 to provide slave firing of a purality of Triacs. Triacs 192, 194 and 196 which are connected in series with load 198, 200, and 202 respectively, are connected in parallel across terminals 186 and 190, which are connected to the supply terminals 86 and 88 respectively. Gates 204, 206, and 208 of Triacs 192, 194 and 196 respectively are connected by resistors 210, 212 and 214 respectively to junction 216. Junction 216 is connected to the junction of capacitor 120 and diode 108 by series connected to Zener diode 218 and resistor 220.

Whereas the operation of the circuit with respect to Triac 90 is the same as that set forth with respect to FIG. 4, only the slave control of Triacs 192, 194 and 196 will now be set forth. If in response to a decrease in temperature of thermistor 142, the voltage at terminal 188 and gate 126 of SCR 110 is reduced below the value necessary to turn on SCR 110, the RC phase shift circuit comprising capacitor 100 and resistor 102 will supply a signal to gate 98 of Triac 90 at a zero-voltage preceeding a positive half cycle to turn it on. The supply voltage then appearing across load 92 will also appear at the junction of capacitor 120 and diode 108 so as to be applied through resistor 220 and Zener diode 218 to the gates 204, 206 and 208 of slave Triacs 192, 194 and 196. Zener diode 218 provided isolation of slave Triacs 192, 194 and 196 from master Triac 90. This voltage will first turn-on the most sensitive of slave Triacs 192, 194 and 196. The turning on of this most sensitive Triac will raise the voltage appearing at junction 216 to such a level that the remaining two slave Triacs will be immediately turned on.

As set forth with respect to FIG. 4, capacitor 120 is charged during a positive half cycle during which Triac 90 is conducting to provide a signal through diode 122 to the gate 98, of Triac 90 during the succeeding negative half cycle to cause it to remain in conduction. Again, the most sensitive of slave Triacs 192, 194 and 196 is turned on by the voltage appearing at the junction of capacitor 120 and diode 108. Similarly, the turning on of this most sensitive Triac raises the voltage appearing at junction 216 to such a level that the remaining two slave Triacs will be immediately turned on. Should any one of the Triacs 192, 194, or 196 be caused to conduct during a negative half cycle, without Triac 90 being caused to conduct, the voltage appearing across resistors 210, 212 and 214 would be so excessive as to cause their destruction. To eliminate this possibility, a diode 222 provides a current path to gate 98 of Triac 90 to immediately turn it on, thereby preventing the destruction of resistor 210, 212 and 214.

While particular embodiments of this invention have been shown and described, it will be obvious to those skilled in the art that various changes and modifications may be made without departing from this invention in its broader aspects and, therefore, it is intended that the appended claims cover all such changes and modifications as fall within the true spirit and scope of this invention.

What I claim as new and desire to secure by Letters Patent of the United States is:

1. A circuit for energizing at least one load from an alternating current source comprising:
  (a) a voltage regulator connected to be energized by the alternating current source to establish a voltage pedestal of a predetermined magnitude less than the peak magnitude of the alternating current source,
  (b) a resistance voltage divider comprising at least two resistive elements connected across said voltage regulator to be energized by the voltage pedestal including:
    (1) a first variable resistor,
    (2) a variable resistance sensing element,
  (c) a controllable semiconductive device having two main current carrying terminals and at least one control terminal,
    (1) said control terminal connected to be energised in accordance with the portion of the voltage pedestal appearing across one of said resistance elements, and
(d) at least one thyristor having two main current carrying terminals connected in series with one of the loads across the alternating current supply, and at least one gate terminal,
 (1) said controllable semiconductive device having its main current carrying terminals connected to control the application of a signal to said gate terminal of said thyristor, such that when said variable resistance sensing element exhibits a first resistance magnitude, said controllable semiconductive device permits a signal to be applied to said gate terminal of said thyristor to cause said thyristor to exhibit a low impedance between its main current carrying terminals to energize the load, and such that when said variable resistance sensing element exhibits a second resistance magnitude, said controllable semiconductive device does not permit a signal to be applied to said gate terminal of said thyristor to cause said thyristor to exhibit a low impedance between its main current carrying terminals and energize the load, whereupon said thyristor exhibits a high impedance between its main current carrying terminals and the load is not energized.

2. The circuit for energizing a load from an alternating current source defined in claim 1 wherein said thyristor is a bidirectional triode thyristor, said circuit comprising in addition a capacitor connected in series with a first diode across the load to be charged when the load is energized when said controllable semiconductive device permits a signal to be applied to said gate terminal of said bidirectional triode thyristor, and which is connected in series with a second diode to provide a signal to said gate terminal of said thyristor to cause said bidirectional triode thyristor to exhibit a low impedance between its main current carrying terminals to energize the load during the next succeeding half cycle.

3. The circuit for energizing at least one load from an alternating current source defined in claim 1 wherein there are at least three thrystors, each of which is a bidirectional triode thyristor, and wherein the circuit comprises in addition a capacitor connected in series with a first diode across a first load which is connected in series with a first one of said bidirectional triode thyristors to be charged when the first load is energized when said controllable semiconductive device permits a signal to be applied to said gate terminal of said first one of said bidirectional triode thyristors, said capacitor also being connected in series with a second diode to provide a signal to said gate terminal of said first one of said bidirectional triode thyristors to cause said first one of said bidirectional triode thyristors to exhibit a low impedance between its main current carrying terminals to energize the first load during the next succeeding half cycle, and said gate terminals of said other bidirectional triode thyristors are connected to receive gate signals from the junction of said capacitor with said first and second diodes, whereby said other bidirectional triode thyristors are caused to exhibit low impedances between their main current carrying terminals to energize other loads whenever said first one of said bidirectional triode thyristors exhibits a low impedance between its main current carrying terminals.

4. The circuit for energizing at least one load from an alternating current source defined in claim 1 comprising in addition a phase shift circuit connected in series with the main current carrying terminals of said controllable semiconductive device across the alternating current source whereby when said variable resistance sensing element exhibits a first resistance magnitude, said semiconductor controlled device permits a signal to be applied to said gate terminal of said thyristor at the zero voltage point preceding a positive half cycle of the alternating current source.

5. The circuit for energizing at least one load from an alternating current source defined in claim 1 comprising in addition a pair of transistors forming an amplifier, the input to said amplifier being the voltage pedestal appearing across one of said resistance elements and the output being supplied to the control terminal of said controllable semiconductive device.

6. A circuit for energizing a load from an alternating current source comprising:
(a) a voltage regulator connected to be energized by the alternating current source to establish a voltage pedestal of a predetermined magnitude,
(b) a resistance voltage divider comprising at least two resistive elements connected to be energized by the voltage pedestal including:
 (1) a first variable resistor,
 (2) a variable resistance sensing element,
(c) a differentiating circuit connected in parallel with a first one of said resistance elements, to create a positive pulse across a second one of said resistance elements,
(d) a controllable semiconductive device having two main current carrying terminals and at least one control terminal,
 (1) said control terminal connected to be energized by the portion of the voltage pedestal and the positive pulse appearing across said second one of said resistance elements, and
(e) a thyristor having two main current carrying terminals connected in series with the load across the alternating current supply and at least one gate terminal,
 (1) said controllable semiconductive device having its main current carrying terminals connected to control the application of a signal to said gate terminal of said thyristor, such that when said variable resistance sensing element exhibits a first resistance magnitude, said controllable semiconductive device permits a signal to be applied to said gate terminal of said thyristor to cause said thyristor to exhibit a low impedance between its main current carrying terminals to energize the load, and such that when said variable resistance sensing element exhibits a second resistance magnitude, said controllable semiconductive device does not permit a signal to be applied to said gate terminal of said thyristor to cause said thyristor to exhibit a low impedance between its main current carrying terminals and energize the load, whereupon said thyristor exhibits a high impedance between its main current carrying terminals and the load is not energized.

7. The circuit for energizing a load from an alternating current source defined in claim 6 comprising in addition a phase lift circuit connected in series with said voltage regulator to cause the portion of the voltage pedestal and the positive pulse appearing across said second one of said resistance elements to be out of phase with the alternating current source, whereby when said variable resistance sensing element exhibits a first resistance magnitude, said semiconductor controlled device permits a signal to be applied to said gate terminal of said thyristor at the zero voltage point preceding a positive half cycle of the alternating current source.

8. A circuit for energizing a load from an alternating current source defined in claim 6 wherein said differentiating circuit comprises a resistor and a capacitor connected in series.

9. The circuit for energizing a load from an alternating current source defined in claim 6 wherein said thyristor is a reverse blocking triode thyristor.

10. The circuit for energizing a load from an alternating current source defined in claim 9 comprising in addition a diode connected in parallel with said reverse blocking triode thyristor to conduct current in the opposite direction of said reverse blocking triode thyristor to energize the load during the half cycle said reverse blocking triode thyristor is blocking.

11. The circuit for energizing a load from an alternating current source defined in claim 6 wherein said voltage regulator is a Zener diode.

12. The circuit for energizing a load from an alternating current sourse defined in claim 6 wherein said voltage regulator comprises at least one diode and said diode is energized by only a portion of the alternating current supply voltage.

13. The circuit for energizing a load from an alternating current source defined in claim 12 comprising in addition a transistor forming an amplifier, the input to said amplifier being the portion of the voltage pedestal and the positive pulse appearing across said second one of said resistance elements and the output being supplied to the control terminal of said controllable semiconductive device.

References Cited

UNITED STATES PATENTS 3,346,874 10/1967 Howell _____ 307—305 X
3,390,275 6/1968 Baker _____ 307—252

DONALD D. FORRER, Primary Examiner

B. P. DAVIS, Assistant Examiner

U.S. Cl. X.R.

307—252, 305